UNITED STATES PATENT OFFICE.

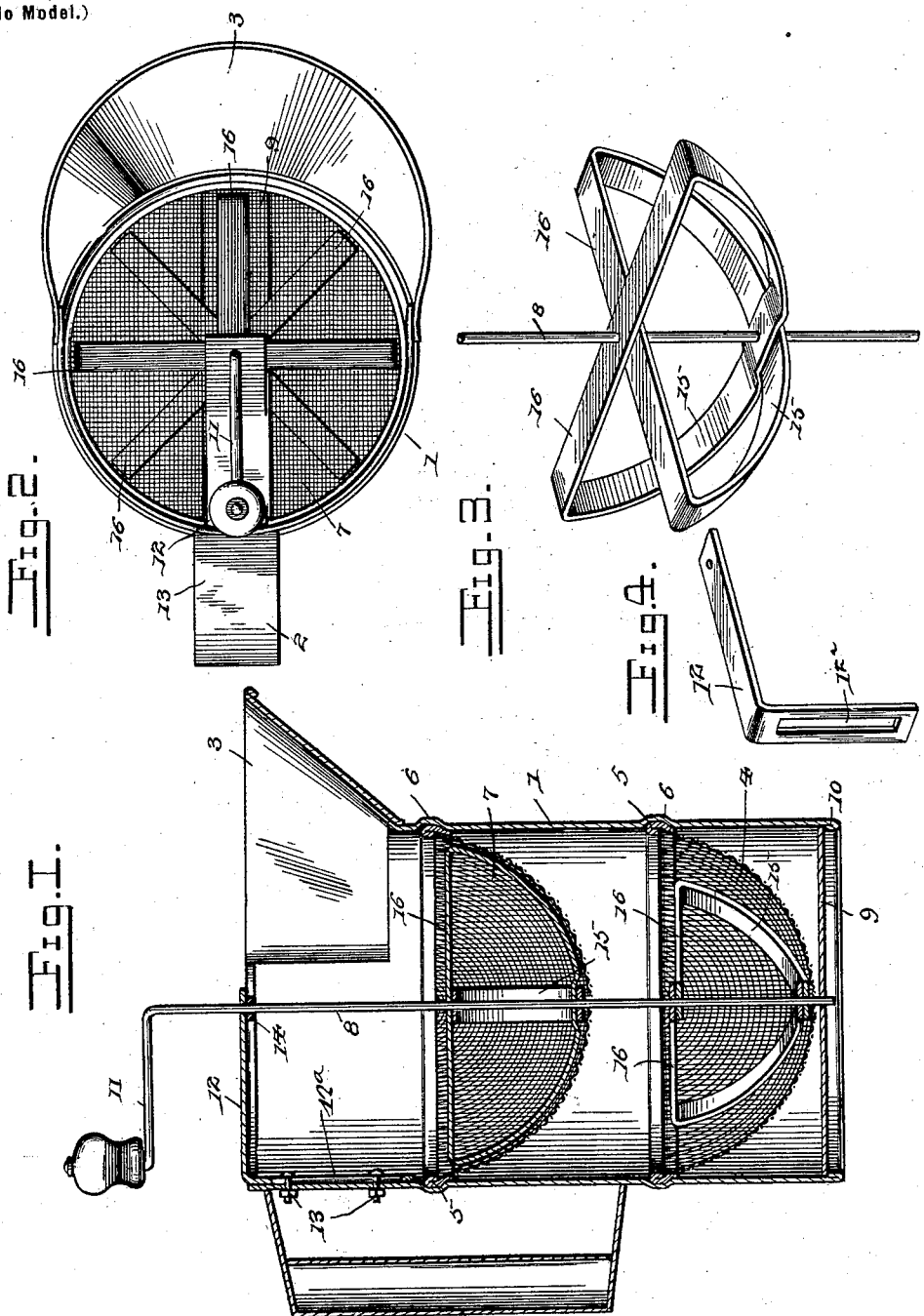

EFFIE P. SWANTON, OF OWEN, MAINE.

SIFTER.

SPECIFICATION forming part of Letters Patent No. 671,390, dated April 2, 1901.

Application filed January 5, 1900. Serial No. 501. (No model.)

*To all whom it may concern:*

Be it known that I, EFFIE P. SWANTON, a citizen of the United States, residing at Owen, in the county of Penobscot and State of Maine, have invented a new and useful Sifter, of which the following is a specification.

This invention relates to sifters, and has for its object to provide an improved device of this character which is especially designed for sifting flour and arranged to facilitate the introduction of the material to be sifted into the sifter and to prevent packing or clogging of the material at the mouth of the device. It is furthermore designed to provide an improved agitator for cutting and breaking the lumps which may be in the flour, to effectively force the latter through the sieve, and to prevent the flour from being thrown out of the device during the operation of the agitator.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a central longitudinal sectional view of a sifter constructed in accordance with the present invention. Fig. 2 is a top plan view thereof. Fig. 3 is a detail perspective view of the agitator. Fig. 4 is a detail perspective view of the arm for supporting the agitator-shaft.

Corresponding parts in the several figures of the drawings are designated by like characters of reference.

Referring to the accompanying drawings, 1 designates the body of the device, which is preferably cylindrical in shape and open at the opposite upper and lower ends thereof. Located exteriorly and projecting radially from the body is a handle 2, and located diametrically opposite the handle is an outwardly-flaring spout or scoop 3, whereby the flour or other material to be sifted may be conveniently scooped up and introduced into the body of the device. It will be observed that the upper portion of the body is cut away and that the scoop is formed by a separate piece, so that it projects outwardly beyond the outer face of the body in order that the size of the entrance-opening may be increased. Located within the body and adjacent to the lower end thereof is a hollow substantially hemispherical sieve 4, which is bowed downwardly and opens upwardly and is also provided with a substantially circular marginal bead or rim 5, which strengthens the foraminous material of which the sieve is formed and holds the same in shape.

The interior walls of the body 1 are provided with a continuous marginal groove 6, which is formed by an outwardly-directed bead and is designed to receive the rim of the sieve, so as to support the latter within the body of the device and also to permit of the sieve being conveniently removed for cleansing or for any other desired purpose. Located above the lower sieve 4 is another sieve 7, constructed and arranged in identically the same manner as described for the former sieve. It is preferable to employ a plurality of superposed sieves, so that the material may be treated a plurality of times, and thereby more effectively sifted than if passed through one sieve only.

Located centrally and extending diametrically within the body of the device is a shaft 8, which has its lower end journaled in a transverse brace or bar 9, located at the lower end of the body and supported upon the upper edge of an inner flange 10. The upper end of the shaft extends a suitable distance above the body of the device and is provided with a suitable operating crank or handle 11. The shaft is also journaled at its upper end in the inner end of a radial brace 12, which is removably secured to the upper end of the body 1 and adjacent to the handle 2 by means of a suitable detachable fastening 13, and the inner end of the brace terminates at about the longitudinal center of the body, so as not to obstruct the mouth of the scoop 3. A suitable annular shoulder or collar 14 is provided on the shaft and bears against the under side of the brace 12, so as to prevent accidental upward movement of the shaft. The sieves are provided with agitators, which are duplicates in construction and arrangement, and a single agitator has been shown in detail in Fig. 3 of the drawings. Each agitator comprises one or more bowed blades 15, each of which is formed from a flat strip having a central opening through which the shaft 8 passes, so that the blade extends equally and radially at opposite sides of the shaft with which it is designed to rotate. The opposite ends of each bowed blade are connected by means of a flat substantially straight blade 16, which is also provided with a central opening for the reception of the shaft and forms the chord of the arc provided by the bowed blade. It is preferable to employ at least two such composite blades which are disposed substantially at right angles to each other, although a greater number may be employed, as desired. As the agitators are fixedly connected to the shaft, they form stops to prevent accidental outward displacement of the sieves, and the shaft is removably mounted in order that the sieves may be removed, as will be understood.

As illustrated in Fig. 1, the bowed members of the blades fit snugly the inner sides of the respective sieves, so as to force the material through the sieves, and the blades also travel with their narrow edges in advance, so that the straight upper members 16 are designed to cut and break up any lumps which may be in the material. It will also be noted that the brace 12 does not extend entirely across the mouth or entrance of the scoop and the body, so that the material to be sifted does not meet with any obstructions when being scooped up by the scoop 3, and the agitators are located below the scoop and operate in a horizontal direction, so that they do not interfere with the introduction of the material into the body of the sifter and do not throw the material out of the device during the operation of the agitator.

As best illustrated in Figs. 1 and 4 of the drawings, the shaft-supporting arm 12 is of substantially L shape, the vertical member thereof being provided with a longitudinal slot 12ª for the reception of the opposite fastenings 13, which are carried by the body 1, so that the arm may be adjusted vertically should it be desired to raise the agitators within the respective sieves. It will be noted that these fastenings 13 are in the form of bolts, and the nuts thereof are located exteriorly of the body, so as to be readily accessible for adjusting the arm 12. Moreover, these fastenings are adjacent to and in line with the handle 2, so as to guard against accidental loosening or removal of the nuts. The lower end of the arm 12 terminates at or adjacent to the upper edge of the rim of the uppermost sifter or sieve, so as to overhang the latter and form a stop to prevent accidental upward displacement of the sieve.

What is claimed is—

A sifter comprising a tubular body open at the top and bottom and provided at its front with a scoop, a handle fixed to the back of the body, a horizontal bar arranged within the body at the bottom thereof and fixed to the same, a removable sieve located above the bar, a central longitudinal shaft journaled at its lower end in the horizontal bar and provided at its upper portion with a collar or shoulder 14, the agitator mounted on the shaft and arranged within the sieve, and the L-shaped arm having a longitudinally-slotted vertical portion detachably and adjustably secured to the inner face of the body by fastening devices arranged in the slot, said L-shaped arm having a horizontal portion perforated to receive the shaft and engaging the collar or shoulder 14, whereby the shaft is detachably held in position, substantially as described.

In testimony that I claim the foregoing as my own I have hereto affixed my signature in the presence of two witnesses.

EFFIE P. SWANTON.

Witnesses:
S. M. LEIGHTON,
FRANK FLAGG.